United States Patent [19]
Carter et al.
[11] Patent Number: 4,740,878
[45] Date of Patent: Apr. 26, 1988

[54] DUAL VOLTAGE POWER SUPPLY HAVING EQUALLY SPLIT VOLTAGE LEVELS

[75] Inventors: Nick G. Carter, Bulverde; Douglas D. Myron, Austin, both of Tex.
[73] Assignee: International Conservation Systems, Inc., Austin, Tex.

[21] Appl. No.: 59,539
[22] Filed: Jun. 8, 1987
[51] Int. Cl.[4] ............ H02M 7/02
[52] U.S. Cl. ............ 363/63; 363/89; 323/267
[58] Field of Search ............ 363/63, 89, 126; 323/267

[56] References Cited

U.S. PATENT DOCUMENTS 3,646,428 2/1972 Torok ............ 323/267
3,747,008 7/1973 Zaretsky ............ 323/267 X
3,826,969 7/1974 Eichelberger et al. ............ 323/267
4,281,377 7/1981 Evans ............ 363/63
4,622,511 11/1986 Moore ............ 323/267 X

*Primary Examiner*—Peter S. Wong
*Attorney, Agent, or Firm*—Arnold, White & Durkee

[57] ABSTRACT

A DC power supply provides plural output voltages with respect to a common reference potential by splitting a DC input voltage potential. The input voltage is equally split into dual voltages by the embodiment described. A buffer circuit is provided between a voltage divider network and an output circuit stage coupled to the load. The buffer circuit operates to maintain a reference voltage node in the output stage at a potential substantially equal to the potential at the common node of the voltage divider network. The split voltages appear as independent power supplies to the load coupled to the power supply.

6 Claims, 1 Drawing Sheet

DUAL VOLTAGE POWER SUPPLY HAVING EQUALLY SPLIT VOLTAGE LEVELS

BACKGROUND OF THE INVENTION

The present invention relates to power supplies for providing a plurality of output voltages. More particularly, it relates to a single DC power supply which splits an input voltage into a plurality of output voltages.

Many electronic circuits require operating electrical power at more than one voltage level. For example, circuits using operational amplifier devices often require +12 and −12 volts supplies. Conventionally, two completely independent power supplies are provided. This is, however, expensive and often impractical because of the input voltage available to the power supply. One alternative when a simple input voltage is present is use of a resistive voltage divider circuit has been used to split an input voltage into dual output voltages. The voltage at the divider network common node establishes a reference voltage. Under load, the reference voltage can change, thereby shifting the operating bias point of the supply and rendering the split voltage unequal. The shift can be reduced by making the resistor values smaller. But, low resistor values are often undesirable because the load on the power supply is increased and energy lost. There can also be degradation in common mode rejection of operational amplifiers in the circuitry being supplied with operating power. Also, increased noise in the power supply can result.

SUMMARY OF THE INVENTION

The present invention reduces bias shift in the power supply reference yet permits use of large resistance values in the voltage divider network.

This is accomplished by providing a controlled, bilateral current driver in parallel with a voltage divider network. The divider network sets a desired reference voltage. The controlled current driver establishes an output voltage reference node at a potential substantially equal to the reference voltage. A control element coupled to the divider network provides control of the current driver.

BRIEF DESCRIPTION OF THE DRAWINGS

A written description setting forth the best mode presently known for carrying out the present invention, and of the manner of implementing and using it, is provided by the following detailed description of a preferred embodiment which is illustrated in the attached drawing Figure which is a schematic diagram of a power supply circuit in accordance with the present invention providing dual split voltages.

DETAILED DESCRIPTION OF THE PREFERRED EMBODIMENT

Figure 1:
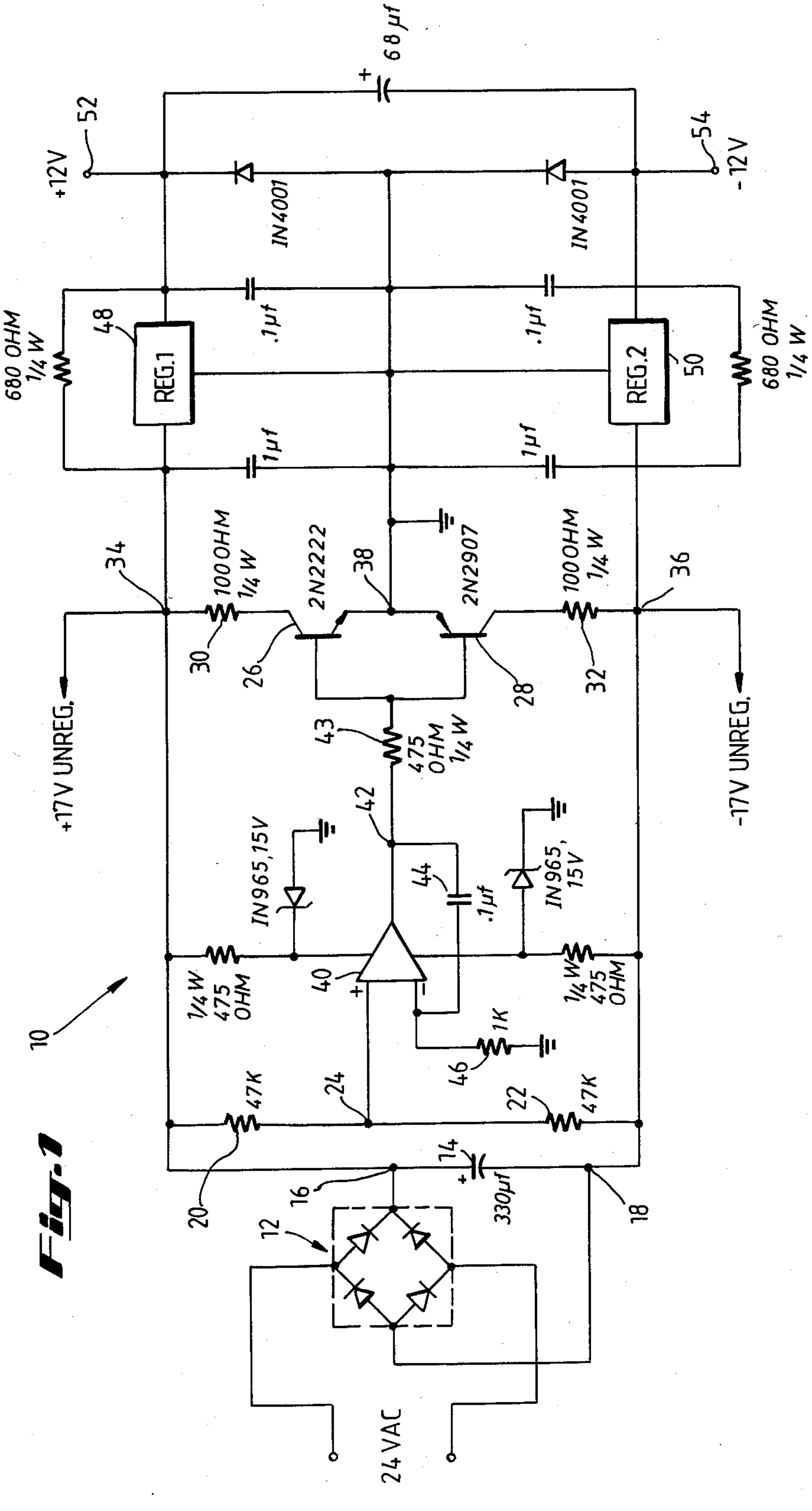

Referring to drawing FIG. 1, a schematic diagram of a DC power supply 10 in accordance with the present invention is illustrated. The power supply is adapted to operate from a 24 volt alternating current input and provides dual voltages in the form of +12 volts DC and −12 volts DC referenced to a circuit ground potential. The 24 volts AC input power may be derived from a step-down transformer from 120 volts AC, 60 Hz power line such as that available in residences or commercial buildings. To convert the AC input power to direct current, a full-wave rectifier bridge 12 is provided. Capacitor 14 provides filtering of the rectifier output. The rectified voltage is at a 34 volts DC level at no load and supplied to power supply 10 at terminals 16 and 18. A voltage divider network including resistors 20 and 22 is connected between the terminals. The series interconnection of resistors 20 and 22 defines a voltage reference node 24. The resistors 20 and 22 are chosen to be of equal value. Therefore, there is an approximately equal split of the approximately 34 volts to levels of approximately 17 volts each across resistors 20 and 22.

An output circuit stage providing a current source is connected in parallel with the voltage divider network. In the circuitry shown in FIG. 1, the output stage includes transistors 26 and 28 connected in a push-pull configuration. Also included in the output circuit stage are resistors 30 and 32, which are coupled to the respective collectors of the transistors 26 and 28. The output circuit stage has first and second terminals 34 and 36 providing the split, dual voltage outputs of +17 volts and −17 volts. The voltage potential at terminals 34 and 36 is with respect to node 38. The voltage potential at node 38 is intermediate the potential difference across the voltage divider network. In the circuit shown, the voltage across the voltage divider network is 34 volts. Accordingly, node 38 is at a voltage level potential intermediate the 24 volts range. To provide +17 volts and −17 volts, node 38 is established as the circuit ground potential. The output circuit stage is adapted to be coupled to the load. Coupling of the load may be to the +17 volts terminal, the −17 volts terminal, or both, depending upon the configuration of the electrical circuit serving as the load.

A buffer circuit is coupled between the voltage reference node 24 of the voltage divider network and the output circuit stage. The buffer circuit maintains the output reference voltage node 38 at a potential substantially equal to the potential at the voltage divider network node 24. The buffer circuit includes an operational amplifier 40 having its non-inverting input coupled to node 24. The output terminal 42 of amplifier 40 is coupled to the output circuit stage. In the circuitry of FIG. 1, the operational amplifier 40 provides an output control signal to the base of both transistors 26 and 28. A resistor 43 couples the output terminal 42 to the transistors in the output circuit stage. A feedback capacitor 44 and a resistor 46 are also included as is conventional practice with an operational amplifier. If a current imbalance to node 38 is within the current capability of the operational amplifier, transistors 26 and 28 may be eliminated and the output terminal 42 used as node 38.

If regulated DC power is desired, an output regulator stage may be connected to the power supply. In FIG. 1, regulator circuits 48 and 50 are shown connected to the output circuit stage of the power supply. Also, filter capacitors and protection diodes are shown in the schematic diagram. Regulated +12 volts power is available at terminal 52. Similarly, regulated −12 volts power is available from terminal 54.

In operation, when the output circuit stage delivers current to the load, which returns to circuit ground, the buffer circuit will control transistors 26 and 28 to source or sink current to maintain the reference voltage node 38 at a potential substantially equal to that at voltage reference node 24. The reference voltage node is held at constant voltage by the action of the buffer circuit. The sourcing and sinking of current is referred herein as "bidirectional current drive."

The values of the voltage divider network resistors 20 and 22 can be chosen to be of different values. This will cause an unequal splitting of the input voltage into two voltages of unequal potential. Further, the voltage divider network may include more than two resistance elements to define more than a single node and provide multiple taps. Modification to include multiple taps will further utilize multiple buffer circuits and result in multiple reference voltages and multiple output voltages. Multiple output voltages might be used if the circuit loads to be powered require different voltage levels, such as low voltage digital circuits, operational amplifier circuits, and high voltage power control devices such as a relay.

The foregoing description of the invention has been directed to a particular preferred embodiment for purposes of explanation and illustration. It will be apparent, however, to those skilled in this art that many modifications and changes may be made without departing from the scope and spirit of the invention. It is the applicant's intention the following claims to cover all equivalent modifications and variations as fall within the scope of the invention as defined by the following claims.

What is claimed is:

1. A DC power supply providing plural output voltages, split from an input voltage, comprising:

a pair of terminals to receive an input voltage;

a voltage divider network connected between the terminals and including first and second resistive elements connected in series at a common node to establish a reference voltage;

an output circuit stage connected in parallel with the voltage divider network to define output terminal nodes providing plural output voltages and an output voltage reference node;

the output circuit stage providing bidirectional current drive to the output voltage reference node so as to establish a voltage level thereon;and a buffer circuit coupled between the common node of the voltage divider network and the output circuit stage, for controlling the output circuit stage to establish the output voltage reference node at a potential substantially equal to the voltage divider network common node reference voltage.

2. The power supply of claim 1 wherein the output circuit stage comprises a pair of transistors connected in a push-pull configuration with their base terminals interconnected to define an input control terminal coupled to the buffer circuit and their source terminals interconnected to define the output voltage reference node.

3. The power supply of claim 1 further comprising a voltage regulator stage coupled to the output circuit stage.

4. The power supply of claim 1 wherein the buffer circuit includes an operational amplifier having a non-inverting input coupled to the common node of the voltage divider network and an output terminal.

5. The power supply of claim 1 wherein the output circuit stage and the buffer circuit are included within an operational amplifier having its output terminal coupled to the output voltage reference node.

6. The power supply of claim 1 wherein the output circuit stage comprises a pair of transistors in a push-pull configuration, and the buffer circuit comprises an operational amplifier; the common source interconnection of the transistors defining the output voltage reference node and an input of the operational amplifier being connected to the voltage divider network common node.

* * * * *